(12) United States Patent
Ono

(10) Patent No.: US 12,300,789 B2
(45) Date of Patent: May 13, 2025

(54) NON-AQUEOUS ELECTROLYTE SECONDARY BATTERY

(71) Applicant: Prime Planet Energy & Solutions, Inc., Tokyo (JP)

(72) Inventor: Masato Ono, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 580 days.

(21) Appl. No.: 17/666,440

(22) Filed: Feb. 7, 2022

(65) Prior Publication Data

US 2022/0255136 A1    Aug. 11, 2022

(30) Foreign Application Priority Data

Feb. 9, 2021    (JP) .................................. 2021-018733

(51) Int. Cl.
*H01M 10/0583* (2010.01)

(52) U.S. Cl.
CPC .............................. *H01M 10/0583* (2013.01)

(58) Field of Classification Search
CPC ......... H01M 10/0585; H01M 10/0583; H01M 10/0459; H01M 10/045; H01M 10/0454; H01M 10/0431; H01M 10/125; H01M 10/286; H01M 50/463; H01M 50/466
See application file for complete search history.

(56) References Cited

U.S. PATENT DOCUMENTS

2004/0043289 A1* 3/2004 Shimamura ......... H01M 50/562
429/153
2014/0212729 A1   7/2014 Park et al.

FOREIGN PATENT DOCUMENTS

JP    2014049193 A  *  3/2014
JP    6093369 B2      3/2017

OTHER PUBLICATIONS

JP 2014049193 A—machine translated (Year: 2014).*

* cited by examiner

*Primary Examiner* — Kourtney R S Carlson
*Assistant Examiner* — Travis L. Martin
(74) *Attorney, Agent, or Firm* — HAUPTMAN HAM, LLP

(57) ABSTRACT

A non-aqueous electrolyte secondary battery disclosed herein includes a non-aqueous electrolyte and a stacked electrode body including a cell unit, the cell unit including a first electrode, a first separator, a second electrode, and a second separator. The first electrode has a first active material layer. The second electrode has a second active material layer. The first active material layer has a facing region facing the second active material layer at the central part thereof, and has a non-facing region not facing the second active material layer at the outer periphery thereof. The non-facing regions at a pair of opposite ends of the first active material layer each have a through hole. The first separator and the second separator are folded toward the second electrode side outside the non-facing region having a through hole. The first separator and the second separator are joined in a through hole.

4 Claims, 3 Drawing Sheets

NON-AQUEOUS ELECTROLYTE SECONDARY BATTERY

BACKGROUND OF THE INVENTION

1. Field of the Invention

The present disclosure relates to a non-aqueous electrolyte secondary battery. This application claims the benefit of foreign priority to Japanese Patent Application No. 2021-018733, filed on Feb. 9, 2021, the entire contents of which are incorporated herein by reference.

2. Description of the Related Art

In recent years, non-aqueous electrolyte secondary batteries such as lithium secondary batteries have been suitably used for portable power sources for personal computers, mobile devices, etc., or vehicle driving power sources for battery electric vehicles (BEVs), hybrid electric vehicles (HEVs), plug-in hybrid electric vehicles (PHEVs), etc.

A general non-aqueous electrolyte secondary battery includes an electrode body in which a positive electrode and a negative electrode are laminated via a separator. Electrode bodies as such are roughly classified into wound electrode bodies and stacked electrode bodies. A stacked electrode body has a constitution in which positive electrodes and negative electrodes are alternately laminated via separators intervened therebetween.

As one example of a method for producing a stacked electrode body, a method including forming a plurality of monocells each including a first electrode, a first separator, a second electrode, and a second separator that are laminated in this order and further stacking these monocells (for example, see Japanese Patent No. 6093369). In this production method, separators and electrodes are bonded with an adhesive in order to prevent the misalignment between electrodes and separators. For example, Japanese Patent No. 6093369 discloses coating both surfaces of the first separator with an adhesive and coating only a surface of the second separator that faces the second electrode with an adhesive in order to bond the separators and the electrodes with the adhesive.

SUMMARY OF THE INVENTION

However, in a conventional technique, non-aqueous electrolytes (particularly, electric charge carriers (for example, lithium ions or the like)) are hard to move in a part coated with an adhesive in a separator, which results in an increase in resistance. In addition, when a non-aqueous electrolyte secondary battery is discharged and charged repeatedly, active materials expand and contract repeatedly. When active materials expand, constraining pressure increases, and a non-aqueous electrolyte is extruded from a stacked electrode body. In conventional techniques, a non-aqueous electrolyte is hard to pass a part coated with an adhesive in a separator, and therefore, the extruded non-aqueous electrolyte is hard to return to a stacked electrode body, which results in an increase in resistance.

Hence, an object of the present disclosure is to provide a non-aqueous electrolyte secondary battery with small initial resistance and suppressed resistance increase after the repeated discharging and charging.

A non-aqueous electrolyte secondary battery disclosed herein includes a non-aqueous electrolyte, and a stacked electrode body including a cell unit, the cell unit including, a first electrode, a first separator, a second electrode, and a second separator which are laminated in this order. The first electrode has a first current collector and a first active material layer. The second electrode has a second current collector and a second active material layer. The first active material layer faces the second active material layer. The area of the main surface of the first active material layer of the first electrode is larger than the area of the main surface of the second active material layer of the second electrode. The first active material layer has a facing region facing the second active material layer at the central part thereof. The first active material layer has a non-facing region not facing the second active material layer at an outer periphery thereof. The non-facing regions at a pair of opposite ends of the first active material layer each have a through hole. The area of the main surface of the first separator and the area of the main surface of the second separator are larger than the area of the main surface of the first active material layer of the first electrode and the area of the main surface of the second active material layer of the second electrode. The laminated part of the first separator and the second separator covers an opening of the through hole on a surface of the first active material layer, the surface facing the second active material layer. The first separator and the second separator are folded toward a second electrode side outside the non-facing region having through holes so as to cover an opening of a through hole disposed on a surface, opposite to the surface facing the second active material layer, of the first active material layer. The laminated part of the first separator and the second separator are joined to a folded part of the first separator and the second separator in the through hole. According to such a constitution, a non-aqueous electrolyte secondary battery with small initial resistance and suppressed resistance increase after the repeated discharging and charging is provided.

In one desired embodiment of a non-aqueous electrolyte secondary battery disclosed herein, the position of the end of the folded part of the first separator and the second separator is positioned outward of a laminated part of the first active material layer and the second active material layer. According to such a constitution, the folded part of a first separator and a second separator of one cell unit does not overlap a second electrode of the other cell unit. Thus, the stacked structure of a stacked electrode body is less likely to be distorted, and the electrode-to-electrode distance between a first electrode of one cell unit and a second electrode of the other cell unit can be kept small and constant.

In one desired embodiment of a non-aqueous electrolyte secondary battery disclosed herein, the first electrode is a negative electrode, and the second electrode is a positive electrode. According to such a constitution, the area of the main surface of the negative electrode active material layer is larger than the area of the main surface of the positive electrode active material layer, and therefore, ions that function as electric charge carriers (for example, lithium ions or the like) are prevented at a high level from precipitating as metals.

In one desired embodiment of a non-aqueous electrolyte secondary battery disclosed herein, the stacked electrode body includes a stacked body in which a plurality of the above-mentioned cell units is stacked, such that outermost layers of the stacked body are respectively a positive electrode and a negative electrode, and a single negative electrode. The single negative electrode is laminated on the positive electrode of the outermost layer of the stacked body. According to such a constitution, lithium in the positive electrode of the outermost layer can be used in discharging and charging, and cell capacities can be improved.

DESCRIPTION OF THE PREFERRED EMBODIMENTS

Embodiments according to the present disclosure are described below with reference to drawings. It should be noted that matters that are not mentioned in the present description but are necessary for implementing the present disclosure can be recognized as design matters for a person skilled in the art based on conventional techniques in the art. The present disclosure can be implemented based on the content disclosed in the present description and a common general technical knowledge in the art. In the appended drawings, members and portions having the same effect are assigned with the same numerals or symbols. The dimensional relationships (lengths, widths, thicknesses, etc.) in each drawing do not reflect actual dimensional relationships.

Hereinafter, the present embodiment will be described in detail while illustrating a lithium ion secondary battery as an example. It should be noted that the term "secondary battery" used in the present description refers to a power storage device capable of being discharged and charged repeatedly and encompasses a so-called storage battery and an electrical storage element such as an electric double layer capacitor. The term "lithium secondary battery" used in the present description refers to a secondary battery that uses lithium ions as electric charge carriers and enables discharging and charging by the charge transfer associated with lithium ions between positive and negative electrodes.

Figure 1:
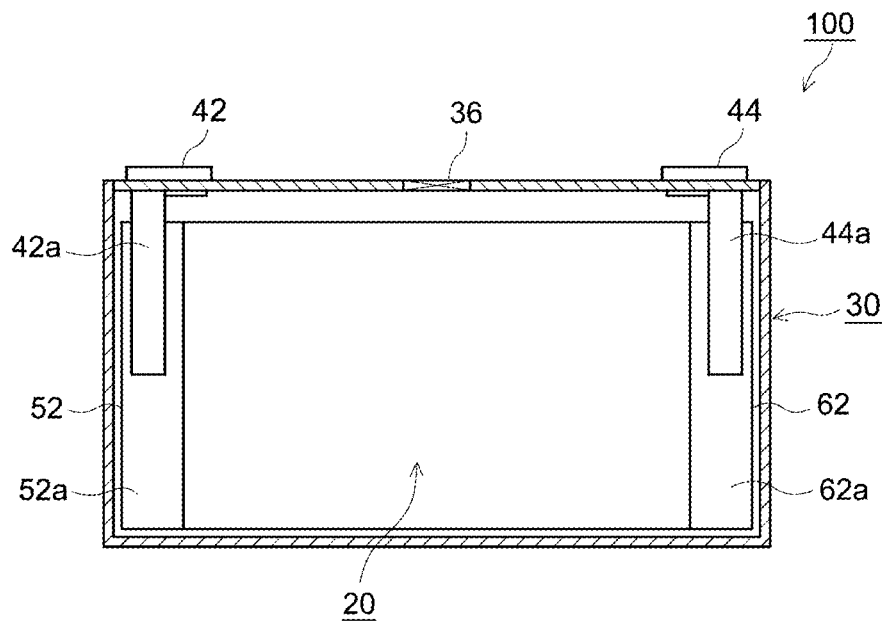
FIG. 1 is a sectional view schematically illustrating the inner structure of a lithium ion secondary battery according to an embodiment of the present disclosure.

FIG. 1 schematically illustrates the inner structure of a lithium ion secondary battery 100 according to the present embodiment. The lithium ion secondary battery 100 illustrated in FIG. 1 includes a stacked electrode body 20, a non-aqueous electrolyte (not illustrated), and a rectangular battery case 30 that houses these. The battery case 30 is sealed, and therefore, the lithium ion secondary battery 100 is a sealed battery.

As illustrated in FIG. 1, a positive electrode terminal 42 and a negative electrode terminal 44 for external connection and a thin safety valve 36 set to release the internal pressure of the battery case 30 when the internal pressure rises to reach a predetermined level or higher are installed in the battery case 30. The battery case 30 is provided with a liquid injection port (not illustrated) for injecting the non-aqueous electrolyte. A positive electrode terminal 42 is electrically connected to a positive electrode current collector plate 42a. A negative electrode terminal 44 is electrically connected to a negative electrode current collector plate 44a.

Metal materials such as aluminum are used as the material of the battery case 30 because such metal materials are lightweight and have high heat conductivity. However, the material of the battery case 30 is not limited to this, and the battery case 30 may be made of resin. Alternatively, the battery case 30 may be a laminate case made using a laminate film or the like.

Figure 2:
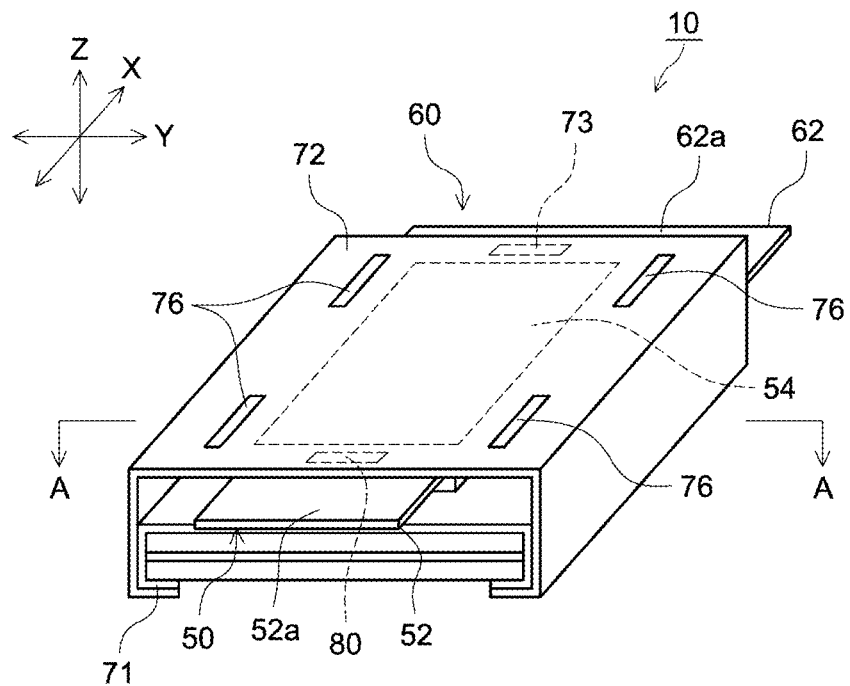
FIG. 2 is a perspective view schematically illustrating a cell unit included in a stacked electrode body of a lithium ion secondary battery according to an embodiment of the present disclosure.
Figure 3:
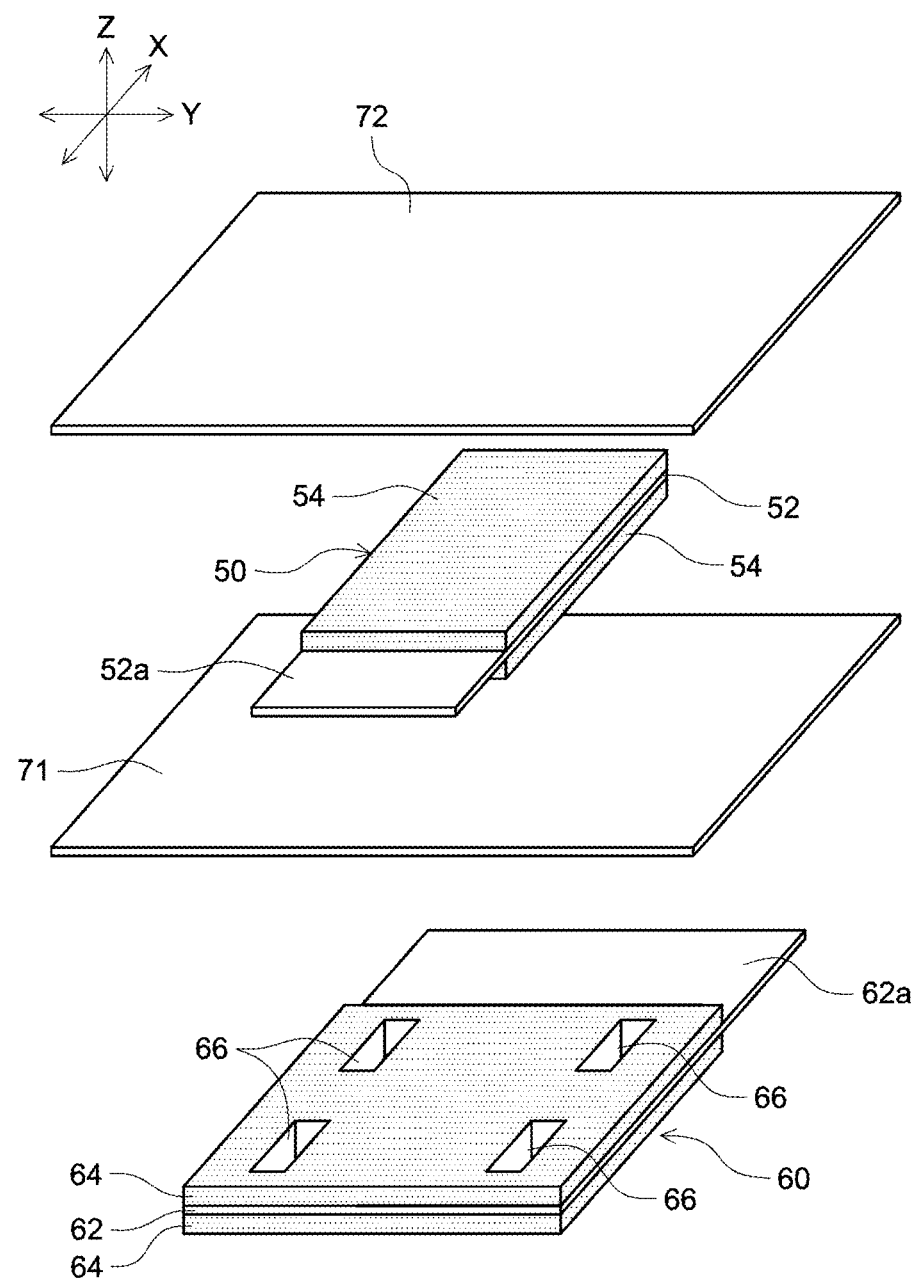
FIG. 3 is an exploded perspective view schematically illustrating a cell unit included in a stacked electrode body of a lithium ion secondary battery according to an embodiment of the present disclosure.
Figure 4:
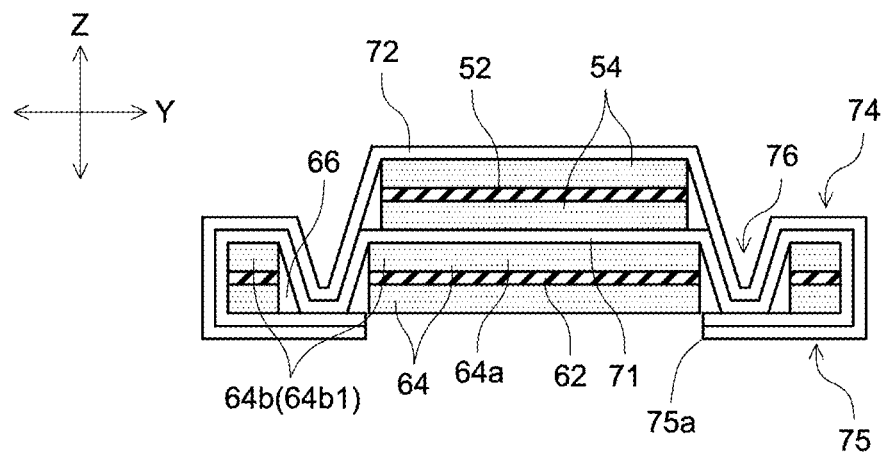
FIG. 4 is a sectional view schematically illustrating a cell unit included in a stacked electrode body of a lithium ion secondary battery according to an embodiment of the present disclosure.

FIGS. 2 to 4 schematically illustrate cell units 10 included in the stacked electrode body 20. FIG. 2 is a perspective view of a cell unit 10. FIG. 3 is an exploded perspective view in which the cell unit 10 is exploded to structural components thereof. FIG. 4 is a sectional view along the line A-A in FIG. 2. Accordingly, FIG. 4 is a sectional view along the width direction of the positive electrode 50 and the negative electrode 60 and along the laminated direction of the positive electrode 50 and the negative electrode 60. In the FIGS. 2 to 5, the X direction is the longitudinal direction of the positive electrode 50 and the negative electrode 60 included in the stacked electrode body 20, the Y direction is the width direction of the positive electrode 50 and the negative electrode 60 included in the stacked electrode body 20, and the Z direction is the laminated direction of the positive electrode 50 and the negative electrode 60.

The stacked electrode body 20 includes at least one cell unit 10 as illustrated. Typically, the stacked electrode body 20 includes a plurality of cell units 10. The number of cell units 10 in the stacked electrode body 20 is not particularly limited and may be the same as or similar to the number of cell units in a stacked electrode body used in a conventional lithium ion secondary battery. For example, the number of cell units may be 1 or more and 150 or less, desirably 20 or more and 100 or less.

The cell unit 10 includes a negative electrode 60 as the first electrode, a separator 71 as the first separator, a positive electrode 50 as the second electrode, and a separator 72 as the second separator, as illustrated in FIGS. 2 to 4, particularly FIG. 3. In the cell unit 10, the negative electrode 60, the separator 71, the positive electrode 50, and the separator 72 are laminated in this order.

The positive electrode 50 includes a positive electrode current collector 52 and a positive electrode active material layer 54 disposed on the positive electrode current collector 52. As illustrated in FIG. 3, positive electrode active material layers 54 are disposed on both surfaces of the positive electrode current collector 52 in the present embodiment. However, a positive electrode active material layer 54 may be disposed only on one surface of the positive electrode current collector 52. A positive electrode active material layer unformed part 52a is disposed at one end of the positive electrode 50. The positive electrode active material layer unformed part 52a is a part where the positive electrode active material layer 54 is not formed, and the positive electrode current collector 52 is exposed. A tape for insulation or an insulation coat layer containing alumina, boehmite, or the like may be formed at a part of the positive electrode active material layer unformed part 52a.

The negative electrode 60 includes a negative electrode current collector 62 and a negative electrode active material layer 64 disposed on the negative electrode current collector 62. As illustrated in FIG. 3, negative electrode active material layers 64 are disposed on both surfaces of the negative electrode current collector 62 in the present embodiment.

However, a negative electrode active material layer 64 may be disposed only on one surface of the negative electrode current collector 62. A negative electrode active material layer unformed part 62a is disposed at one end of the negative electrode 60. The negative electrode active material layer unformed part 62a is a part where the negative electrode active material layer 64 is not formed and the negative electrode current collector 62 is exposed.

As illustrated in FIGS. 1 to 3, the positive electrode active material layer unformed part 52a and the negative electrode active material layer unformed part 62a protrude from a laminated part of the positive electrode active material layer 54 and the negative electrode active material layer 64 in mutually opposite directions. The positive electrode active material layer unformed part 52a and the negative electrode active material layer unformed part 62a each function as a current corrector tab. The shapes of the positive electrode active material layer unformed part 52a and the negative electrode active material layer unformed part 62a are not limited to those illustrated in figures and may be processed by cutting or the like into given shapes. The protruding directions of the positive electrode active material layer unformed part 52a and the negative electrode active material layer unformed part 62a are not limited to those illustrated in figures. The positive electrode active material layer unformed part 52a and the negative electrode active material layer unformed part 62a may have shapes and be disposed at positions such that the active material layer unformed parts do not overlap and may protrude in the same direction.

In a stacked electrode body 20, positive electrode active material layer unformed parts 52a of a plurality of cell units 10 are gathered and electrically joined to the positive electrode current collector plate 42a as illustrated in FIG. 1. The negative electrode active material layer unformed parts 62a of a plurality of cell units 10 are gathered and electrically joined to the negative electrode current collector plate 44a as illustrated in FIG. 1. The joining of these is made by, for example, ultrasonic welding, resistance welding, laser welding, or the like.

The positive electrode current collector 52 may be formed of a sheet-shaped or foil-shaped member made of metals with good conductivity (for example, aluminum, nickel, titanium, stainless steel), and an aluminum foil or the like is desirably used. The thickness of the positive electrode current collector 52 is not particularly limited and, for example, 5 µm to 35 µm and desirably 7 µm to 20 µm.

The positive electrode active material layer 54 contains at least a positive electrode active material. Examples of the positive electrode active material include lithium-transition metal composite oxides such as lithium-nickel-cobalt-manganese composite oxides (for example, $LiNi_{1/3}Co_{1/3}Mn_{1/3}O_2$ and the like), lithium-nickel composite oxides (for example, $LiNiO_2$ and the like), lithium-cobalt composite oxides (for example, $LiCoO_2$ and the like), and lithium-nickel-manganese composite oxides (for example, $LiNi_{0.5}Mn_{1.5}O_4$ and the like), and the like. The positive electrode active material layer 54 may further include a conductive material, a binder, or the like. For example, carbon materials such as carbon black, including acetylene black (AB), or other carbon materials (such as graphite) can be used as the conductive material. For example, polyvinylidene fluoride (PVDF) or the like may be used as the binder. The thickness of the positive electrode active material layer 54 is not particularly limited and, for example, 20 µm to 300 µm.

The negative electrode current collector 62 may be formed of a sheet-shaped or foil-shaped member made of metals with good conductivity (for example, copper, nickel, titanium, stainless steel, of the like), and a copper foil is desirably used. The thickness of the negative electrode current collector 62 is not particularly limited and, for example, 5 µm to 35 µm, desirably 7 µm to 20 µm.

The negative electrode active material layer 64 contains at least a negative electrode active material. Examples of the negative electrode active materials include carbon materials such as graphite, hard carbon, soft carbon, and the like. The negative electrode active material layer 64 may further include a binder, a thickener, or the like. For example, a styrene-butadiene rubber (SBR) or the like may be used as the binder. For example, carboxymethylcellulose (CMC) or the like may be used as the thickener. The thickness of the negative electrode active material layer 64 is not particularly limited and, for example, 20 µm to 300 µm.

As the separator 71 and the separator 72, various porous sheets the same as or similar to porous sheets that have conventionally been used in lithium ion secondary batteries may be used. Examples of such porous sheets include porous resin sheets made of polyolefins such as polyethylene (PE) or polypropylene (PP). Such porous sheets may be a single layer structure or may be a multilayer structure including two or more layers (for example, a three-layer structure in which PP layers are laminated on both surfaces of a PE layer). The separator 71 and the separator 72 may include a heat-resistant layer (HRL). The thicknesses of the separator 71 and the separator 72 are not particularly limited and, for example, 10 µm to 40 µm.

In the present embodiment, the area of the main surface of the negative electrode active material layer 64 of the negative electrode 60 is larger than the area of the main surface of the positive electrode active material layer 54 of the positive electrode 50. This constitution can prevent lithium ions from being precipitated as metal lithium at a high level. It should be noted that a main surface of an active material layer means a surface having the largest area among surfaces constituting an active material layer. Thus, the main surfaces of the negative electrode active material layer 64 in the present embodiment are a surface in contact with the negative electrode current collector 62 and an opposite surface opposing this surface. The main surfaces of the positive electrode active material layer 54 are a surface in contact with the positive electrode current collector 52 and an opposite surface opposing this surface. Meanwhile, the areas of the main surfaces of the separator 71 and the separator 72 are larger than the area of the main surface of the negative electrode active material layer 64 of the negative electrode 60 and the area of the main surface of the positive electrode active material layer 54 of the positive electrode 50, respectively, from the viewpoint of insulating properties and capability of joining at the through hole 66 as described later. It should be noted that a main surface of a separator means a surface having the largest area among surfaces constituting a separator.

The positive electrode 50 is sandwiched by the separator 71 and the separator 72. The positive electrode active material layer 54 of the positive electrode 50 is not bonded to the separator 71 and the separator 72. Accordingly, an adhesive that inhibits the movement of the non-aqueous electrolyte to the positive electrode active material layer 54 and the movement of the non-aqueous electrolyte from the positive electrode active material layer 54 does not exist in the present embodiment, and therefore, the non-aqueous electrolyte is easy to move.

In the present embodiment, the positive electrode 50 may not be bonded to the separator 71 and the separator 72, but the positive electrode 50 may be bonded to the separator 71 and separator 72 at a place other than the positive electrode active material layer 54. The place other than the positive electrode active material layer 54 is, for example, the positive electrode active material layer unformed part 52*a* in the positive electrode 50. In an example illustrated in FIG. 2, a bonded part 80 in which the positive electrode active material layer unformed part 52*a* of the positive electrode 50 and the separator 72 are bonded with an adhesive is provided. In addition, although not illustrated, the positive electrode active material layer unformed part 52*a* of the positive electrode 50 and the separator 71 are also bonded. In this way, bonding the positive electrode 50 to the separator 71 and the separator 72 at a place other than the positive electrode active material layer 54 suppresses the misalignment of these components when the cell units 10 are constructed and cell units 10 are stacked. Examples of an adhesive that may be used include known adhesives such as a hot melt adhesive, a UV-curable adhesive, a heat-curable adhesive, and the like.

The separator 71 and the separator 72 may be joined at another part outside the positive electrode 50 in addition to the joint part 76 described below. In the illustrated example, joint parts 73 with the separator 71 and the separator 72 are provided outside the end, opposite to the end at which the positive electrode active material layer unformed part 52*a*, of the positive electrode 50 is formed. The joint part 73 is formed by, for example, ultrasonic welding or the like. Disposing the joint parts 73 with the separator 71 and the separator 72 outside the positive electrode 50 suppresses the misalignment of the positive electrode 50, separator 71, and separator 72 when the cell units 10 are constructed and cell units 10 are stacked. In particular, when the bonded part 80 is provided in the positive electrode active material layer unformed part 52*a* of the positive electrode 50, and the joint part 73 exists outside the end, opposite to the positive electrode active material layer unformed part 52*a*, of the positive electrode 50 as the illustrated example, the misalignment can be suppressed at a high level.

Figure 5:
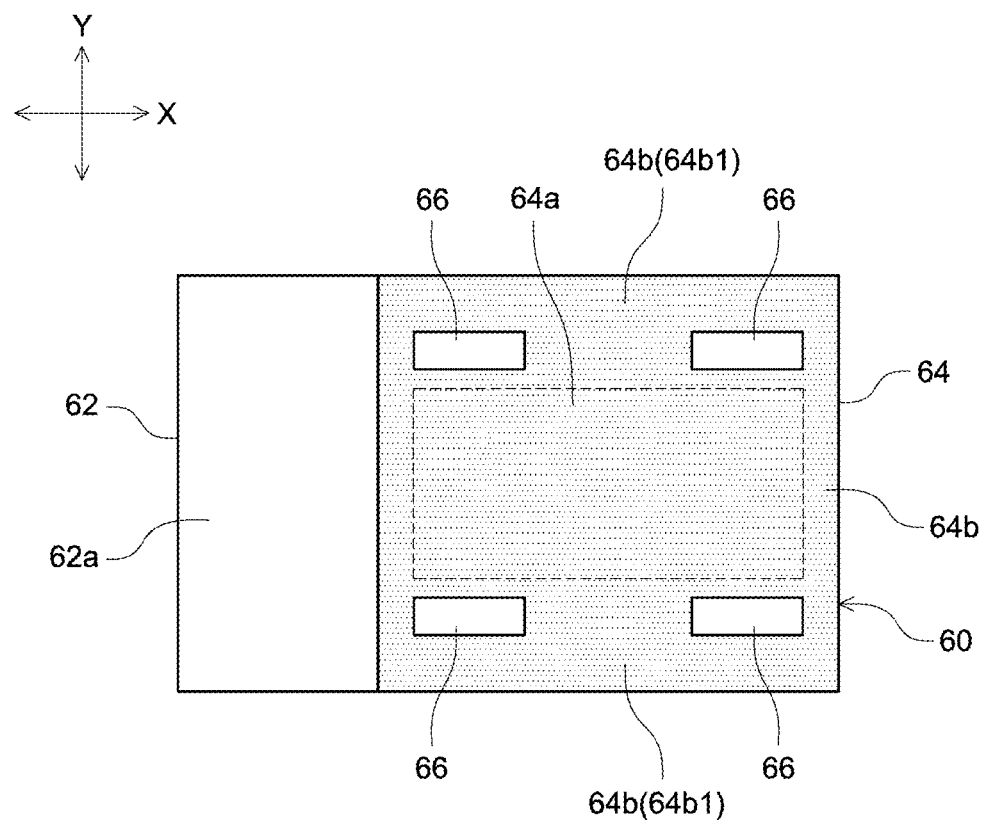
FIG. 5 is a schematic view of a negative electrode of a cell unit included in a stacked electrode body of a lithium ion secondary battery according to an embodiment of the present disclosure.

FIG. 5 schematically illustrates the negative electrode 60. As illustrated in FIGS. 3 to 5, the positive electrode 50 and the negative electrode 60 are laminated so that the positive electrode active material layer 54 faces the negative electrode active material layer 64. As illustrated in FIGS. 4 and 5, a facing region 64*a* that faces the positive electrode active material layer 54 is formed at the central part of the negative electrode active material layer 64. A non-facing region 64*b* that does not face the positive electrode active material layer 54 is formed at the outer periphery of the negative electrode active material layer 64.

As illustrated in FIGS. 3 to 5, the non-facing regions 64*b*1 at a pair of opposing ends of the negative electrode active material layer 64 in the Y direction each have a through hole 66. In the illustrated example, non-facing regions 64*b*1 at a pair of ends of the negative electrode active material layer 64 are non-facing regions 64*b*1 at a pair of opposing ends of the negative electrode 60 in the direction orthogonal to the protruding direction of the negative electrode active material layer unformed part 62*a*. Accordingly, in the illustrated example, the non-facing regions 64*b*1 at a pair of ends of the negative electrode active material layer 64 are ends of the negative electrode active material layer 64 that does not have the negative electrode active material layer unformed part 62*a*.

The shape and the dimension of the through holes 66 are not particularly limited as long as the separator 71 and the separator 72 can be joined in the through holes 66 mentioned below. For example, when the joining at a through hole 66 mentioned below is achieved by ultrasonic welding, the through hole 66 has a dimension into which a welding horn of the ultrasonic welding device is insertable. In the illustrated example, the opening part of a through hole 66 is in a rectangular shape but may be in a circular shape, an ellipse shape or the like.

The number of through holes 66 is not particularly limited. In the illustrated example, two through holes 66 are formed on each of the non-facing regions 64*b*1 at a pair of ends of the negative electrode active material layer 64, but at least one through hole 66 may be formed on each of the non-facing regions 64*b*1. Desirably, one to three through holes 66 are formed at each of the non-facing regions 64*b*1 at a pair of ends of the negative electrode active material layer 64. The positions of the through holes 66 are not particularly limited. As the illustrated example, in the case where the through holes 66 are disposed at both ends or near both ends of the non-facing regions 64*b*1 at a pair of ends of the negative electrode active material layer 64, the negative electrode 60, the separator 71, and the separator 72 can be firmly integrated, and thus this case is advantageous.

As illustrated in FIG. 4, the part (laminated part) 74 at which the separator 71 and the separator 72 are laminated covers an opening of the through hole 66 on a surface, facing the positive electrode active material layer 54, of the negative electrode active material layer 64.

As illustrated in FIG. 4, the separator 71 and the separator 72 are folded toward the negative electrode 60 side outside the non-facing region 64*b*1 having a through hole 66, and a folded part 75 is thus formed. The separator 71 and the separator 72 covers an opening of a through hole on a surface, opposite to the surface facing the positive electrode active material layer 54, of the negative electrode active material layer 64.

In the through hole 66, the laminated part 74 and the folded part 75 of the separator 71 and separator 72 are joined, and the joint part 76 is thus formed.

According to such a constitution, the positive electrode 50 can be sandwiched and fixed by the separator 71 and the separator 72, and furthermore, the negative electrode 60 can be fixed by the separator 71 and the separator 72. Accordingly, a cell unit 10 in which the positive electrode 50, the negative electrode 60, the separator 71, and the separator 72 are integrated can be configured without using an adhesive to the positive electrode active material layer 54 and the negative electrode active material layer 64.

As a result, inhibition by an adhesive, of the movement of ions (that is, lithium ions in the present embodiment) serving as charge carriers can be prevented in the positive electrode active material layer 54 and the negative electrode active material layer 64, which are regions being greatly involved in discharging and charging. As a result, the initial resistance can be smaller than the conventional techniques, in which a separator and an active material layer are bonded over the whole surface. Additionally, the uniformity of resistances in the plane directions of the positive electrode active material layer 54 and the negative electrode active material layer 64 is excellent. When the discharging and charging of the lithium ion secondary battery 100 are repeated, the non-aqueous electrolyte is extruded and flows out of the stacked electrode body 20 by the expansion of the positive electrode active material layer 54 and the negative electrode active material layer 64. Then, in the lithium ion secondary battery 100, the non-aqueous electrolyte that has flowed out of the stacked electrode body 20 can return to the stacked electrode body 20 without inhibition by an adhesive. As a result, the resistance increase after the repeated discharging and charging can be more efficiently suppressed than the conventional techniques, in which a separator and an active material layer are bonded over the whole surface. In addition, the time required for infiltrating the non-aqueous electrolyte into the electrode body can be shorter when the lithium ion secondary battery 100 is produced.

In addition, integrating one cell unit 10 can suppress the misalignment of the positive electrode 50, the negative electrode 60, the separator 71, and the separator 72 when the cell units 10 are stacked or the like. In addition, integrating one cell unit 10 reduces the lamination number at a lamination stage compared with a case where components are laminated one by one. Accordingly, the stacking of the cell units 10 when the stacked electrode body 20 of the lithium ion secondary battery 100 is produced can be accelerated.

The method for joining the laminated part 74 and the folded part 75 is not particularly limited. These may be bonded with an adhesive or the like. However, four layers of separators (two layers of separators 71+two layers of separators 72) exist in this part to be joined. Thus, ultrasonic welding is advantageous as the joining method due to the easiness of simultaneously joining these four layers.

In the illustrated example, the position 75a of an end of the folded part 75 of the separator 71 and the separator 72 is positioned outward of a laminated part of the negative electrode active material layer 64 and the positive electrode active material layer 54. That is, the position 75a of the end of the folded part 75 is outside the end of the positive electrode 50 in the Y direction. In this case, a folded part 75 of a separator 71 and a separator 72 of one cell unit 10 do not overlap a positive electrode 50 of another cell unit 10 when the cell units 10 are stacked. Thus, the stacked structure of a stacked electrode body 20 is less likely to be distorted, and the electrode-to-electrode distance between a negative electrode 60 of one cell unit 10 and a positive electrode 50 of another cell unit 10 can be kept small and constant.

In the illustrated example, the separator 71 and the separator 72 are folded while being in contact with the side surface of the negative electrode active material layer 64. However, the separator 71 and the separator 72 may not be in contact with the side surface of the negative electrode active material layer 64.

The cell unit 10 can be produced, for example, in the following manner. First, the positive electrode 50, the negative electrode 60, the separator 71, and the separator 72 are prepared. Specifically, the positive electrode 50 in which the positive electrode active material layers 54 are provided on both surfaces of the positive electrode current collector 52 is produced according to a normal method. Specifically, the negative electrode 60 in which the negative electrode active material layers 64 are provided on both surfaces of the negative electrode current collector 62 is produced according to a normal method. Two separators without any adhesive layers are prepared as the separator 71 and the separator 72.

Through holes 66 are formed in a region which is to be a non-facing region 64b1 at a pair of ends of the negative electrode active material layer 64 of the negative electrode 60. The through holes 66 can be formed, for example, by a known method such as laser machining, punching machining, or drill machining.

The positive electrode 50 is sandwiched by the separator 71 and the separator 72. At this time, the positive electrode active material layer unformed part 52a of the positive electrode 50 is bonded to the separator 71 and the separator 72 by adhesion or the like according to need. Furthermore, the separator 71 and the separator 72 are bonded outside the positive electrode 50 by ultrasonic welding or the like according to need.

Next, the resultant assembly is superimposed on the negative electrode 60 such that the positive electrode active material layer 54 faces the central part of the negative electrode active material layer 64 via the separator 71. At this time, the superimposition is performed such that the part (laminated part) 74 at which the separator 71 and the separator 72 are laminated covers an opening of a through hole 66 on a surface, facing the positive electrode active material layer 54, of the negative electrode active material layer 64.

Subsequently, two separators are folded toward the negative electrode side outside the non-facing region 64b1, in which a through hole 66 is formed, of the negative electrode active material layer 64. At this time, the separators are folded such that the part (folded part) 75 that has been folded covers an opening of a through hole on a surface, opposite to the surface facing the positive electrode active material layer, of the negative electrode active material layer.

In the through hole 66, the laminated part 74 and the folded part 75 of the separator 71 and separator 72 are joined by ultrasonic welding or the like. A cell unit 10 in which the positive electrode 50, the negative electrode 60, the separator 71, and the separator 72 are integrated can be obtained in this way.

The stacked electrode body 20 is explained next. When the stacked electrode body 20 is configured by stacking a plurality of cell units 10, adjacent two cell units 10 may be or may not be bonded to each other. When adjacent two cell units 10 are bonded, a negative electrode 60 of one cell unit 10 and a separator 72 of the other cell unit 10 are bonded. In this case, there is an advantage that misalignment is less likely to occur between cell units 10.

When adjacent two cell units 10 are bonded to each other, a negative electrode 60 of one cell unit 10 faces a positive electrode 50 of the other cell unit 10. That is, a negative electrode active material layer 64 of a negative electrode 60 of one cell unit 10 faces a positive electrode active material layer 54 of the other cell unit 10. At this time, it is desired that a negative electrode active material layer 64 of a negative electrode 60 of one cell unit 10 has a facing region facing a positive electrode active material layer 54 of the other cell unit 10, at the central part of the negative electrode active material layer 64 and has a non-facing region that does not face the positive electrode active material layer 54 of the other cell unit 10, at the outer periphery of the negative electrode active material layer 64. Additionally, it is desired that an adhesive (for example, a hot melt adhesive, a UV-curable adhesive, a heat-curable adhesive, or the like) for bonding adjacent two cell units 10 is not disposed in the facing region of the negative electrode active material layer 64 and is disposed in a region other than the facing region (particularly, in a non-facing region). Furthermore, it is desired that the adhesive is not disposed and thereby a channel for flowing a non-aqueous electrolyte is formed in at least a part of the non-facing region. At this time, the infiltrating ability of a non-aqueous electrolyte into the stacked electrode body 20 at the time of manufacture becomes better while suppressing the misalignment between cell units. Additionally, the uniformity of resistances in the plane directions of the electrode becomes better.

When the stacked electrode body 20 is constituted by a stacked body of a plurality of cell units 10, the stacked electrode body 20 is specifically constituted by a stacked body of a plurality of stacked cell units 10 stacked such that the negative electrode 60 of one cell unit 10 faces the positive electrode 50 of the other cell unit 10 in adjacent two cell units 10. In this stacked body, one outermost layer constitutes the positive electrode 50, and the other outermost layer constitutes the negative electrode 60. The stacked electrode body 20 further includes a single negative electrode in addition to the stacked body, and the single negative electrode may be laminated on the positive electrode 50 of the outermost layer of the stacked body. Then, lithium in the positive electrode 50 of the outermost layer can be used in discharging and charging, and cell capacities can be improved.

The non-aqueous electrolyte is explained next. A non-aqueous electrolyte that is the same as or similar to a non-aqueous electrolyte used in known lithium ion secondary batteries may be used. Typically, the non-aqueous electrolyte contains a non-aqueous solvent and a supporting salt (that is, an electrolyte salt). As the non-aqueous solvent, various organic solvents such as carbonates, ethers, esters, nitriles, sulfones, and lactones, which are used as non-aqueous electrolytes for known lithium ion secondary batteries, may be used without any particular limitations, and among them, carbonates are desired. Examples of carbonates include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), trifluorodimethyl carbonate (TFDMC), and the like. The non-aqueous solvent may be used singly or may be used in appropriate combination of two or more types. As the supporting salt, for example, lithium salts such as $LiPF_6$, $LiBF_4$, or $LiClO_4$ (desirably $LiPF_6$) may be desirably used. The concentration of the supporting salt is desirably 0.7 mol/L or more and 1.3 mol/L or less.

The non-aqueous electrolyte may include components other than the components mentioned above, for example, various additives such as gas-generating agents such as biphenyl (BP) or cyclohexylbenzene (CHB); thickeners; and film-forming agents unless the effects of the present disclosure are not remarkably impaired.

The lithium ion secondary battery 100 has a small initial resistance and shows suppressed resistance increase after the repeated discharging and charging. That is, the lithium ion secondary battery 100 is excellent in resistance characteristics. In addition, lithium ion secondary battery 100 is excellent in infiltrating ability of a non-aqueous electrolyte into the stacked electrode body 20 at the time of manufacture.

The lithium ion secondary battery 100 can be used in various types of applications. Examples of suitable uses include driving power sources mounted on vehicles such as battery electric vehicles (BEV), hybrid electric vehicles (HEV), or plug-in hybrid electric vehicles (PHEV). In addition, the lithium ion secondary battery 100 may be used as a storage battery of a small size electric power storage device and the like. The lithium ion secondary batteries 100 may typically be used in the form of a battery pack including a plurality of the lithium ion secondary batteries connected in series and/or in parallel.

As stated above, the present embodiment is described using a lithium ion secondary battery as an example. However, the technique disclosed herein relates to a joint structure in the cell units 10, and therefore, it is understood that the technique disclosed herein is also applicable to a non-aqueous electrolyte secondary battery that uses a charge carrier other than lithium ions.

In the present embodiment, a first electrode having an active material layer with a larger main surface area is taken as a negative electrode, and a second electrode is taken as a positive electrode. However, in the technique disclosed herein, a first electrode may be taken as a positive electrode, and a second electrode may be taken as a negative electrode.

Hereinafter, examples relating to the present disclosure will be described in detail, but the present disclosure is not intended to be limited to those shown in such examples.

Preparation of Lithium Ion Secondary Battery for Evaluation

Example 1

A positive electrode with positive electrode active material layers containing $LiNi_{0.8}Co_{0.1}Mn_{0.1}O_2$ and disposed on both surfaces of an aluminum foil with a thickness of 13 μm was prepared. The dimension of the main surface of the positive electrode active material layer was 300 mm×100 mm, and the thickness of the positive electrode active material layer was 135 μm. A negative electrode with negative electrode active material layers containing natural graphite and disposed on both surfaces of a copper foil with a thickness of 8 μm was prepared. The dimension of the main surface of the negative electrode active material layer was 302 mm×102 mm and the thickness of the negative electrode active material layer was 170 μm. The positive electrode was provided with a positive electrode active material layer unformed part in which an aluminum foil was exposed as illustrated in FIG. 3, and the negative electrode was provided with a negative electrode active material layer unformed part in which a copper foil was exposed as illustrated in FIG. 3.

Two monolayer polypropylene porous films were prepared as separators. The dimension of the main surface of the separator was 306 mm×104 mm, the thickness of the separator was 20 μm, and the air permeability was 170 seconds/100 mL.

Through holes were formed as illustrated in FIGS. 3 and 4 in a region (a region to be a non-facing region), which was not to face the positive electrode active material layer, of the edge of the negative electrode active material layer of the negative electrode. That is, through holes were formed by laser machining near both ends of the end regions to be non-facing regions which were a pair of end regions in a direction orthogonal to the protruding direction of the negative electrode active material layer unformed part.

A positive electrode was sandwiched by two separators, and the resultant laminate was superimposed on a negative electrode such that the center of the positive electrode active material layer matched the center of the negative electrode active material layer. Next, two separators were folded toward the negative electrode side outside the non-facing region in which a through hole was formed.

In the through hole, a four-layered separator on the through hole was welded and joined by ultrasonic welding. Cell units were obtained in this way. Ninety cell units of this type were constructed, and a stacked electrode body was obtained by superimposing these ninety cell units.

$LiPF_6$, as a supporting salt, was dissolved to a concentration of 1.1 mol/L in a mixed solvent containing ethylene carbonate (EC), ethyl methyl carbonate (EMC), and dimethyl carbonate (DMC) in a volume ratio of 3:4:3 to prepare a non-aqueous electrolyte.

Tab leads were attached to a stacked electrode body by ultrasonic welding and the resultant was housed in an aluminum laminate case. The above-mentioned non-aqueous electrolyte was injected into the laminate case, and the laminate case was vacuum sealed. This laminate case was left for 24 hours, pressure at 2 MPa was then applied thereto, and constant current charging (pre-charging) was performed at a current value of 0.2 C to reach 2.75 V. A part of the laminate case was cut under vacuum for degassing, and then the laminate case was sealed again.

Pressure at 1 MPa was applied to this laminate case, then constant current charging at a current value of 0.3 C was performed to reach 4.25 V, and constant voltage charging was performed next at a voltage of 4.25 V while the current cut-off value was set to 1.5 Å to construct a lithium ion secondary battery for evaluation with a SOC of 100%.

Referential Example 1

The same positive electrode and negative electrode as Example 1 were prepared. Separately, two separators, which were the same as those in Example 1 (that is, single layer polypropylene porous films; the dimension of the main surface was 306 mm×104 mm, the thickness was 20 μm, and the air permeability was 170 seconds/100 mL), were prepared.

The positive electrode was sandwiched by two separators. The resultant laminate was superimposed on a negative electrode such that the center of the positive electrode active material layer matched the center of the negative electrode active material layer, without forming through holes in the non-facing region of the negative electrode active material layer of the negative electrode. Cell units were obtained in this way. Ninety cell units of this type were constructed, and a stacked electrode body was obtained by superimposing these ninety cell units. A lithium ion secondary battery for evaluation was constructed using this stacked electrode body in a similar manner to Example 1.

Comparative Example 1

The same positive electrode and negative electrode as Example 1 were prepared. Two polypropylene porous films with adhesive layers containing alumina and polyvinylidene fluoride and disposed on both surfaces thereof were prepared as separators. The dimension of the main surface of the separator was 306 mm×104 mm, the thickness of the separator was 20 μm (adhesive layer: 2 μm+base material: 16 μm+adhesive layer: 2 μm), and the air permeability was 170 seconds/100 mL.

The positive electrode was sandwiched by two separators. The resultant laminate was superimposed on a negative electrode such that the center of the positive electrode active material layer matched the center of the negative electrode active material layer, without forming through holes in the non-facing region of the negative electrode active material layer of the negative electrode. The obtained laminated body was pressurized at a pressure of 0.5 MPa at 90° C. for 1 minute to bond the two separators to the positive electrode and bond one separator to the negative electrode, thereby constructing a cell unit. Ninety cell units of this type were constructed, and a stacked electrode body was obtained by superimposing these ninety cell units. A lithium ion secondary battery for evaluation was constructed using this stacked electrode body in a similar manner to Example 1.

Comparative Example 2

The same positive electrode and negative electrode as Example 1 were prepared. Two polypropylene porous films having an adhesive layer containing alumina and polyvinylidene fluoride on one surface thereof were prepared as separators. The dimension of the main surface of the separator was 306 mm×104 mm, the thickness of the separator was 20 μm (base material: 18 μm+adhesive layer: 2 μm), and the air permeability was 170 seconds/100 mL.

The positive electrode was sandwiched by two separators such that the adhesive layers of the separators face the positive electrode. The resultant laminate was superimposed on a negative electrode such that the center of the positive electrode active material layer matched the center of the negative electrode active material layer, without forming through holes in the non-facing region of the negative electrode active material layer of the negative electrode. The obtained laminated body was pressurized at a pressure of 0.5 MPa at 90° C. for 1 minute to bond the two separators to the positive electrode, thereby constructing a cell unit. Ninety cell units of this type were constructed, and a stacked electrode body was obtained by superimposing these ninety cell units. A lithium ion secondary battery for evaluation was constructed using this stacked electrode body in a similar manner to Example 1.

Evaluation of Initial Resistance Characteristics

After that, a pressure of 1 MPa was applied to each lithium ion secondary battery for evaluation under a temperature environment at 25° C., and the lithium ion secondary battery for evaluation was adjust to the condition of SOC of 50%. After that, constant current discharging at a current value of 2 C was performed for 10 seconds. The voltage changed amount at this time was determined, and the initial resistance value was calculated from the voltage changed amount and the current value. Table 1 shows the results.

Evaluation of Resistance Characteristics after Discharging and Charging Cycle

A pressure of 1 MPa was applied to each lithium ion secondary battery for evaluation under a temperature environment at 25° C. To this battery, a cycle of discharging and charging was repeated for 100 cycles, where each cycle includes constant current charging at 1 C from 2.5 V to 4.25 V and constant current discharging at 1 C from 4.25V to 2.5V. It should be noted that the relaxation time between discharging and charging cycles was set to 10 minutes. After that, a resistance was determined in the same manner as the initial resistance. Table 1 shows the results.

TABLE 1

| | Joint form Separator - positive electrode | Initial resistance (mΩ) | Resistance after 100 cycles (mΩ) |
| --- | --- | --- | --- |
| Referential Example 1 | Not bonded | 0.88 | 0.93 |
| Comparative Example 1 | Face bonding | 0.97 | 1.26 |
| Comparative Example 2 | Face bonding | 0.94 | 1.03 |
| Example 1 | Form illustrated in FIG. 4 | 0.88 | 0.93 |

A comparison between Referential Example 1 and Comparative Example 1 or Comparative Example 2 reveals that resistance characteristics become poor by bonding the separator and the electrode. Particularly, a comparison between Comparative Example 1 and Comparative Example 2 reveals that resistance characteristics become poorer as the area where the adhesive is applied becomes larger.

However, Example 1, in which a through hole was provided in a region, which does not face the positive electrode active material layer, of the negative electrode active material layer, and the separator was folded so as to wrap the end of the negative electrode and joined in the through hole, showed equivalent resistance characteristics to Referential Example 1. Accordingly, it is found that Example 1 provided a lithium ion secondary battery with small initial resistance and suppressed resistance increase after the repeated discharging and charging even though a positive electrode and a separator are joined and fixed.

Accordingly, as described above, it is found that a non-aqueous electrolyte secondary battery described herein shows a small initial resistance and a suppressed resistance increase after the repeated discharging and charging.

As described above, specific embodiments of the present disclosure are explained in detail, but these are mere examples and do not limit the scope of claims. The techniques recited in claims encompasses variations and modifications of specific embodiments mentioned by way of examples.

What is claimed is:

1. A non-aqueous electrolyte secondary battery, comprising:
    a non-aqueous electrolyte and a stacked electrode body including a cell unit, the cell unit including a first electrode, a first separator, a second electrode, and a second separator which are laminated in this order,
    the first electrode having a first current collector and a first active material layer;
    the second electrode having a second current collector and a second active material layer;
    the first active material layer facing the second active material layer;
    an area of a main surface of the first active material layer of the first electrode being larger than an area of a main surface of the second active material layer of the second electrode;
    the first active material layer having a facing region facing the second active material layer at a central part thereof;
    the first active material layer having a non-facing region not facing the second active material layer at an outer periphery thereof;
    the non-facing region at each of a pair of opposite ends of the first active material layer having a through hole;
    an area of a main surface of the first separator and an area of a main surface of the second separator each being larger than the area of the main surface of the first active material layer of the first electrode and the area of the main surface of the second active material layer of the second electrode;
    a laminated part of the first separator and the second separator covering an opening of the through hole at each of the pair of opposite ends on a first surface, facing the second active material layer, of the first active material layer;
    a folded part defined by the first separator and the second separator being folded toward a second electrode side outside the non-facing region at said each of the pair of opposite ends, the folded part covering another opening of the through hole at said each of the pair of opposite ends on a second surface, opposite to the first surface, of the first active material layer; and
    the laminated part being joined to the folded part in the through hole at said each of the pair of opposite ends.

2. The non-aqueous electrolyte secondary battery according to claim 1, wherein
    a position of an end of the folded part is positioned outward of a laminated part of the first active material layer and the second active material layer.

3. The non-aqueous electrolyte secondary battery according to claim 1, wherein
    the first electrode is a negative electrode, and the second electrode is a positive electrode.

4. The non-aqueous electrolyte secondary battery according to claim 1, wherein
    the stacked electrode body includes a stacked body and a single negative electrode,
    the stacked body comprises a plurality of cell units including the cell unit, wherein
        each cell unit of the plurality of cell units includes, in a following order, (i) a negative electrode as the first electrode, (ii) the first separator, (iii) a positive electrode as the second electrode, and (iv) the second separator, and
    the plurality of cell units is stacked such that (a) a first outermost electrode layer of the stacked body is the positive electrode of a first cell unit among the plurality of cell units and (b) a second outermost electrode layer of the stacked body opposite to the first outermost electrode layer is the negative electrode of a second cell unit among the plurality of cell units, and
    the single negative electrode is laminated on the first outermost electrode layer of the stacked body with the second separator of the first cell unit interposed therebetween.

* * * * *